UNITED STATES PATENT OFFICE.

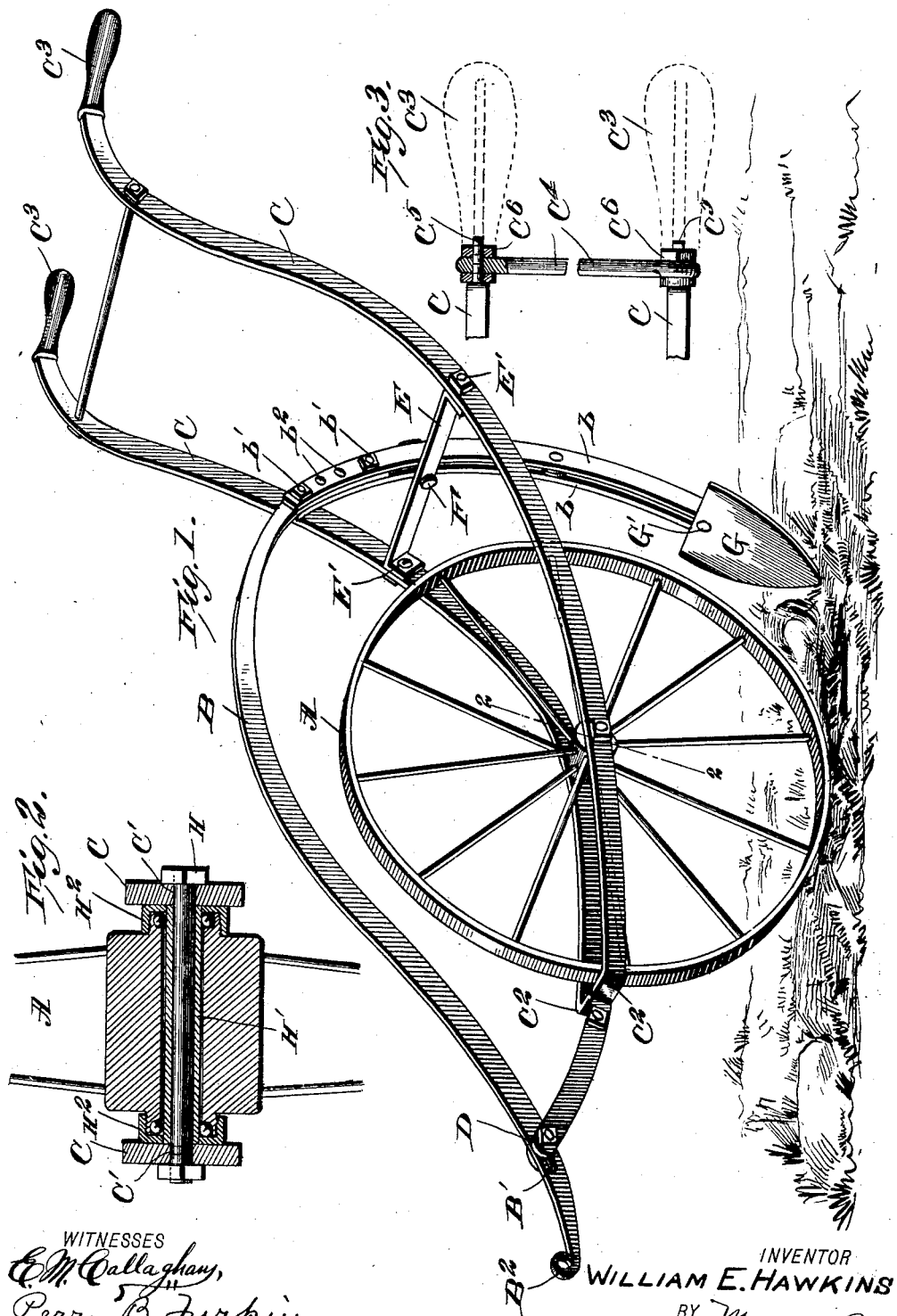

WILLIAM E. HAWKINS, OF McGAHEYSVILLE, VIRGINIA.

GARDEN-PLOW.

No. 830,430.　　　Specification of Letters Patent.　　　Patented Sept. 4, 1906.

Application filed May 15, 1906. Serial No. 316,915.

*To all whom it may concern:*

Be it known that I, WILLIAM E. HAWKINS, a citizen of the United States, and a resident of McGaheysville, in the county of Rocking-ham and State of Virginia, have made certain new and useful Improvements in Garden-Plows, of which the following is a specification.

My invention is an improvement in garden implements, being especially designed for use in plowing and cultivating small plots of ground such as are commonly used for household gardens; and the invention consists in certain novel constructions and combinations of parts, as will be hereinafter described and claimed.

In the drawings, Figure 1 is a perspective view of an implement embodying my invention. Fig. 2 is a detail cross-section on about line 2 2 of Fig. 1, and Fig. 3 is a detail view illustrating a somwhat different construction in connection with the handles.

As shown, the implement comprises the wheel A, the beam B, and the handle-bars C.
The wheel A is journaled at C' in the handle-bars C, and these handle-bars C are deflected inwardly at C² immediately in advance of the wheel A, and thence extend forward parallel to each other and are lapped at their front ends on opposite sides of the beam B and are secured thereto by the bolt D, which bolt is passed through a slot B', the latter being elongated in the direction of length of the beam, so the handle-bars may be adjusted at their front ends along the beam as may be desired.

In rear of the journal C' the handle-bars curve upwardly and flare toward their rear ends, where they are provided with the handholds C³, as shown in full lines, Fig. 1, and in dotted lines in Fig. 3. In some instances it is desired to provide a push-bar C⁴, against which the body of the gardener may press in pushing the machine forward, and this is shown in Fig. 3 of the drawings. In this construction it will be noticed the push-bar C⁴ fits at its ends upon the tangs C⁵, receving the handholds C³, and the latter are threaded to receive the nuts C⁶, by which the bar C⁴ may be secured.

It will be noticed from Fig. 1 that the beam curves downwardly from its front end to the bearings C', and thence upwardly to the handholds, the curve of the beam from front to rear being gradual and continuous. Immediately in rear of the wheel A the handle-bars C are connected by a cross-bar E, bolted at E' to the handle-bars and provided midway between its ends with a bolt F for securing the beam in the manner presently described.
The beam B is adapted at its front end B² to receive any suitable draft device and curves upwardly and thence over the wheel A and down in rear of the wheel and is adapted at its lower end in rear of the wheel to receive a shovel G or other suitable tool, the tool being removably held by a bolt G', and it being understood that any suitable plowing or cultivating tool may be substituted for the shovel G shown. The beam B extends on a continuous unbroken curve over and down in rear of the wheel A, and by preference this beam is made of a main section which extends to a point in rear of the wheel, and a standard-section, consisting of the spaced-apart side bars b, lapped at their upper ends on opposite sides of the main section of the beam and secured thereto by bolts b'. (See Fig. 1.) It may be desired to adjust the standard-section relatively to the main section of the beam, and for such reason a plurality of holes b² for the bolts b' may be provided, so the standard-section may be adjusted up and down upon the rear end of the main section. The standard-section is secured adjustably to the cross-bar E by the bolt F, the latter extending between the side bars b of the standard-section, as shown in Fig. 1.

It will be noticed from Fig. 1 that the beam and the handle-bars both extend on a continuous curve from end to end, and the curvature of the beam is the reverse of that of the handle-bars. When it is desired to adjust the standard-section up or down at its lower end, this may be effected by releasing the nut on the bolt D and adjusting the bolt within the slot b' to secure the desired elevation of the tool on the lower end of the standard-section. I may secure a further adjustment of the standard by means of the bolts b' in connection with the series of holes b², as before described, and adjustment may be secured by the joint action of the bolt within the slot B' and the adjustment of the standard-section relatively to the main section of the beam, as before described.

The construction is simple, inexpensive, easily operated, and will be durable in use.

In practice the implement may be pushed by the operator, or, when desired, a small boy can pull on the front end of the beam by means of a rope connected at B².

In Fig. 2 I show a construction whereby ball-bearings may be utilized in journaling the wheel A. In this construction a cross-bolt H between the handle-bars receives a sleeve H', on which the hub of the wheel turns, the hub being grooved at its ends to form a ball-race, and caps H² threading on the ends of the hub to retain the balls.

I claim—

1. The implement herein described, comprising the beam slotted longitudinally near its front end, and curving thence upwardly with its rear end curved downwardly and slightly toward the front, the handle-bars lapping at their front ends on opposite sides of the slotted portion of the beam, and extending thence rearwardly, and spread apart to receive a wheel and having bearings therefor, the handle-bars curving downwardly and upwardly from their front toward their rear ends, and extending at their rear ends past the downwardly-curved portion of the beam, and on opposite sides thereof, a bolt connecting the front ends of the handle-bars and extending through the slot in the beam, a wheel journaled in the handle-bars, a cross-bar between the handle-bars, and a bolt securing the beam to the said cross-bar, substantially as set forth.

2. The combination in an implement substantially as described, of the wheel, the handle-bars having bearings for the wheel and curving thence upwardly toward its front and rear ends on a continuous curve, the beam extending on a curved line over the wheel and projecting at its front end in advance of the handle-bars and extending at its rear portion between the handle-bars in rear of the wheel, means for adjustably securing the front end of the handle-bars to the beam, and means for adjustably connecting the beam in rear of the wheel with the handle-bars, substantially as set forth.

3. An implement substantially as described, comprising the wheel, the handle-bars provided between their ends with bearings for the wheel and curving thence upwardly toward their front and rear ends, a beam adjustably connecting near its front end with the front ends of the handle-bars and extending thence over the wheel and thence downwardly in rear of the wheel, and composed of a main section and a standard-section connected adjustably therewith, a cross-bar between the handle-bars in rear of the wheel, and a bolt securing the standard-section of the beam to the cross-bar whereby the beam may be adjusted along the handle-bar, all substantially as and for the purposes set forth.

WILLIAM E. HAWKINS.

Witnesses:
SOLON C. KEMON,
PERRY B. TURPIN.